UNITED STATES PATENT OFFICE 2,191,624

WIPING SOLDER

George S. Phipps, Morristown, and Earle E. Schumacher, Maplewood, N. J., assignors to Bell Telephone Laboratories, Incorporated, New York, N. Y., a corporation of New York No Drawing. Application December 2, 1938, Serial No. 243,532

6 Claims. (Cl. 75—166)

The present invention relates to solders and more particularly to wiping solders.

An object of the present invention is a superior solder free from objectionable porosity. A further object is a wiping solder having superior handling qualities and capable of producing more uniformly sound joints.

Wiping solders are solders of the type used in joining sections of lead piping or cable sheathing. To be satisfactory for that purpose they must be coherent and plastic enough to be worked, for example, with the hands, over a considerable temperature range and must form a strong, non-porous joint. Solders for general use, although they need not possess so large a plastic range, should be non-porous and adherent to the metals being joined.

The principal ingredients of these solders are lead and tin. Small amounts of other materials may sometimes be present and in some instances tin may be replaced in part by another metal such as cadmium. The wide temperature range of plasticity of the solder results in the case of wiping solder from the excess of the amount of lead over that required to form a eutectic mixture with the tin. When the wiping solder is cooled from a completely molten state, a temperature is reached at which the liquid alloy is completely saturated with lead. As the solder cools further, particles of primary lead containing small amounts of tin in solid solution are precipitated from solution in the eutectic. Primary lead continues to be precipitated until the freezing point of the eutectic is reached. At this point the entire mass solidifies sharply. The presence of the solid particles of primary lead dispersed throughout the partially liquid solder during the intermediate temperature range mentioned above creates a plastic mass which may be shaped with the hands to form a joint before the solder cools to its final freezing point.

Among other things the soundness of the joint produced depends upon the ability of the solid crystals of primary lead to hold the molten eutectic between the crystals by wetting and by capillary action. If the molten eutectic is not so retained during the plastic state but tends to run off or to run to the bottom of the joint, the joint will usually be porous and therefore unsatisfactory. The ease of handling the plastic solder also depends upon the above-mentioned retention of the molten eutectic, upon the ease with which the crystals of lead slide over one another as the plastic mass is worked into shape, and upon the coherence of the mass of solder.

According to the present invention it has been found that if small quantities of grain refining agent, such as arsenic, are incorporated in wiping solder, the workability and the character of the joint produced are considerably improved. Heretofore the small amount of arsenic present in certain leads has been considered an undesirable impurity and efforts have been made in general to remove the arsenic prior to the use of the lead for various purposes, for instance, for the manufacture of solder. However, the applicants have found that larger quantities of arsenic than those naturally occurring are beneficial to the solder.

The improvement in the solder produced by arsenic appears to be due largely to the remarkable refining action which arsenic has been found to exert on the size of the grains of lead which separate out as the wiping solder cools. In addition to reducing the grain size of the lead markedly, the arsenic also appears to promote a uniform dispersion of the grains throughout the molten eutectic.

The marked reduction in the grain size of the primary lead particles greatly increases the surface area of these particles which is in contact with the molten eutectic. Since wetting and capillarity depend upon the attraction of the liquid to the surface of the solid particles, the resulting retentive forces, which hold the molten eutectic in the mass of plastic solder, are much greater in the small-grained solders which have very large surface contact than in large-grained solders. In addition the presence of the arsenic appears to increase the wetting power of the liquid phase of the solder, thus accentuating the retentive effect caused by the increase in area of contact between the solid grains and the liquid phase. The increased wetting power also tends, in general, to cause a greater adhesion between the solder and the metals being joined. Further, the smallness of the grain size causes a corresponding smallness of the gaps between the grains. This factor also greatly increases the capillary force with which the molten eutectic is held in the gaps between the grains, since capillary action varies inversely with the cross-sectional area of the space in which the liquid is contained. The total effect is a greatly decreased tendency for the liquid component of the solder to run out of the joint or to become unevenly distributed. Sounder joints therefore result.

Similar beneficial results in non-porosity and greater adhesion are obtained in solders for general use, which may contain a lesser proportion of lead than wiping solders.

Since the primary lead grains in the plastic wiping solder are much smaller when arsenic is present, they offer less resistance to working. Further, the molten eutectic, which is much more firmly held in the smaller spaces between the grains, tends to hold the grains apart and is therefore believed to exert a lubricating action which facilitates working. The greater surface contact between the solid grains and the liquid is believed largely responsible for the greater cohesiveness of the arsenic-containing solder.

In general if the amount of arsenic in solders containing between 30 and 40 per cent tin exceeds 0.15 per cent, the arsenic bearing constituent will float to the surface of the solder where it will be removed with the dross during skimming. This therefore sets the upper limit of arsenic in these solders at 0.15 per cent. The smallest amount of arsenic that has been found to have a measurable beneficial effect is about 0.02 per cent. This value has been set as the lower limit of arsenic in these solders. A desirable range of arsenic content lies between .05 per cent and .12 per cent. The preferred range lies between .08 per cent and .12 per cent. The percentage found most desirable is about .1 per cent.

A preferred composition contains 37 per cent tin, .1 per cent arsenic and the remainder lead together with any small amount of incidental impurities which may be present in the ingredients. In this composition, the proportion of arsenic may vary within the limits set forth above. The proportion of tin may also be varied considerably as in ordinary wiping solders, although in general the most satisfactory results are obtained with about 37 per cent. The amount of tin may vary between about 30 per cent and about 40 per cent.

The solder may be prepared in any suitable manner. Thus an ordinary wiping solder alloy may first be prepared, and elemental arsenic then added to the molten alloy in sufficient quantity to produce the desired proportion of arsenic in the final solder. Alternatively, elemental arsenic may be added to molten lead or molten tin and the resulting mixture then alloyed with the other ingredients of the solder. If the arsenic is added first to the lead, care should be taken to prevent excessive volatilization of the arsenic and sufficient arsenic must be employed to take care of whatever volatilization occurs during preparation.

Although the invention has been described with reference to its specific embodiments, certain modifications will be apparent to those skilled in the art and are intended to be included within the scope of the appended claims.

What is claimed is:

1. A wiping solder containing an amount of tin between about 30 per cent and about 40 per cent by weight, an amount of arsenic between about .08 per cent and about .12 per cent by weight, and the remainder lead together with incidental impurities.

2. A wiping solder containing about 37 per cent tin, about .1 per cent arsenic and the remainder lead.

3. A wiping solder containing between about 30 per cent and about 40 per cent by weight of tin, an amount of arsenic between about .02 per cent and about .15 per cent by weight, and the remainder lead together with incidental impurities.

4. A wiping solder consisting of about 30 per cent to about 40 per cent by weight of tin, an amount of arsenic greater than .05 per cent but less than .15 per cent by weight, and the remainder lead together with incidental impurities.

5. A wiping solder containing an amount of tin between about 30 per cent and about 40 per cent by weight, an amount of arsenic greater than .05 per cent but less than about .12 per cent by weight, and the remainder lead together with incidental impurities.

6. A wiping solder containing about 37 per cent tin, an amount of arsenic greater than .05 per cent but less than about .12 per cent by weight, and the remainder lead together with incidental impurities.

GEORGE S. PHIPPS.
EARLE E. SCHUMACHER.